Nov. 7, 1961 R. J. BAGDON 3,007,330
APPARATUS FOR MAKING FLUID SEALING ELEMENTS
Original Filed July 6, 1956
2 Sheets—Sheet 1

Nov. 7, 1961 R. J. BAGDON 3,007,330
APPARATUS FOR MAKING FLUID SEALING ELEMENTS
Original Filed July 6, 1956 2 Sheets-Sheet 2

United States Patent Office 3,007,330
Patented Nov. 7, 1961

3,007,330
APPARATUS FOR MAKING FLUID SEALING ELEMENTS
Richard J. Bagdon, Los Altos, Calif., assignor to Federal-Mogul-Bower Bearings, Inc., Detroit, Mich., a corporation of Michigan
Original application July 6, 1956, Ser. No. 596,328. Divided and this application June 10, 1957, Ser. No. 669,906
5 Claims. (Cl. 69—8)

This invention relates to improvements in apparatus for manufacturing fluid seals of the type employing leather or similar material as the sealing element. This application is a division of application Serial No. 596,328, filed July 6, 1956.

One problem in the manufacture of leather oil seals and similar devices, before this invention, was that a large amount of leather was wasted in manufacturing process. Heretofore, a disk of leather was punched from a hide, coated (if desired) with vulcanizable material, and molded into what resembled a hat with a radial rim and a radial crown connected by an axial portion. The sealing element was then obtained by trimming off much of the outer rim, all of the crown and part of the axial connecting portion. All the trimmings from the outer rim were waste, and so were most of the crown trimmings, although it was sometimes possible to use them in the same kind of process for manufacturing seals of smaller diameter than the original ones. In this prior art process, the crown portion was essential because the molding was done by holding the crown tightly and shaping the remainder by drawing in the outer rim. It was never certain how much leather would be drawn in from the outer rim during the molding and therefore it had to be oversize.

An important object of the present invention is to reduce considerably the amount of waste involved in making annular leather sealing elements.

Another object of the invention is to eliminate the steps, heretofore necessary in making leather sealing elements, of drilling a hole through the center of the crown, trimming the outer rim off, trimming off the crown, and sorting the sealing elements from the trimmings.

Another object of the invention is to provide improved mold equipment for molding leather sealing elements.

Another important object of the invention is to provide apparatus for use in a revolutionary new process for making annular sealing elements from leather and similar materials. In this process, the annulus that is to become the sealing element may be cut out to size from the flat hide. Then the outer periphery, or flange, is held in its cut shape while the pierce portion is drawn during the molding operation. No further trimming is done. The process involves less waste and fewer steps than any process heretofore used in this field, and it results in a better product.

Another object of the invention is to provide an improved finished product. Leather sealing elements are normally clamped in a case between inner and outer metal case members, that is, between the outer case and either a peripheral edge of an L-shaped inner case or a metal washer which the peripheral edge of the inner case bore against. In either event, the outer case was then turned over the inner case to provide the pressure to hold the leather element tightly, but this very operation also tended to cause misalignment between the inner and outer cases. Misalignment resulted in release of the holding pressure except along the circular line adjacent the peripheral edge of the inner case; so leakage became possible. In the present invention, the leather sealing element is provided with a serrated face that provides a series of line contacts and obtains a better resolution of the holding pressure.

Other objects and advantages of the invention will appear from the following description of a preferred embodiment thereof presented in accordance with 35 USC 112.

Figure 1:
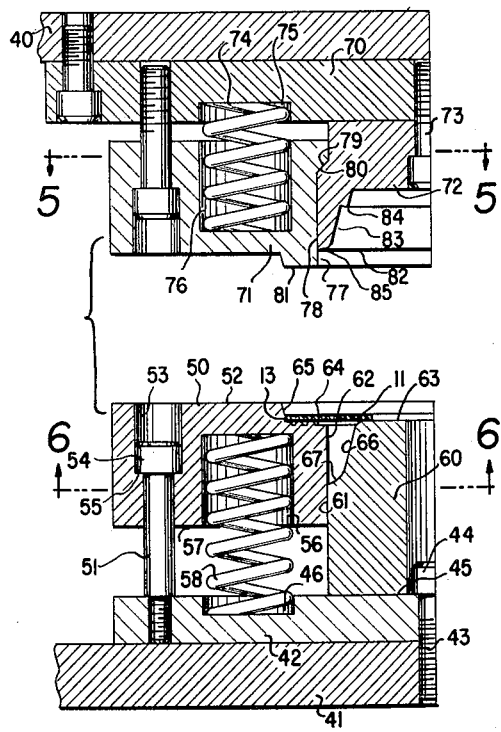
FIG. 1 is a view in elevation and in section of a leather-molding apparatus embodying the principles of the invention, shown in its open position with a flat leather ring inserted in place before the mold is closed.

The drawings illustrate the molding operation with an apparatus which is preferred in the exercise of the present invention. The mold has an upper platen 40 and a lower platen 41. A lower plate member 42 is secured to the lower platen 41 by a bolt 43 whose head 44 bears against the upper surface 45 of the lower plate member 42. The surface 45 is provided with a series of spring-receiving depressions 46 located at circumferential intervals on a given radius.

A lower ring member 50 is secured to the lower plate member 42, preferably by a series of bolts 51 with a lost-motion connection so as to be slidable up and down toward and away from the lower plate member 42. For this purpose its upper surface 52 is provided with a series of recesses 53 in which the bolt heads 54 can slide, with a bottom shelf 55 to stop them at a desired point. The lower ring member 50 is also provided with a series of spring-receiving recesses 56 on its lower surface 57, matching the recesses 46, and a series of helical springs 58 are provided for normally urging the two members 42 and 50 apart into the position shown in FIG. 1, but yielding so that they can be pushed into the position shown in FIGS. 8 and 9 where their surfaces 45 and 57 abut.

Figure 2:
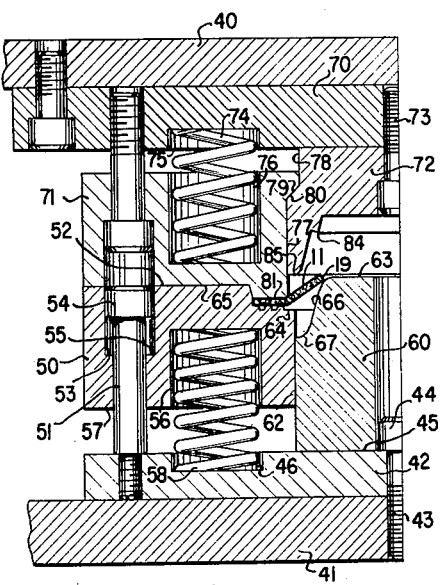
FIG. 2 is a view similar to FIG. 1 with the upper portion of the mold partly closed against the lower portion, and partially depressing a part of the lower portion of the mold so as to deflect upwardly an inner annular portion of the leather ring.
Figure 3:
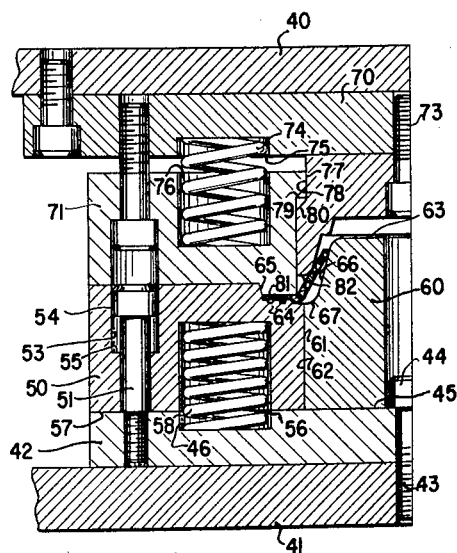
FIG. 3 is a view similar to FIGS. 1 and 2 showing the mold further closed with the spring-supported bottom part fully seated.
Figure 4:
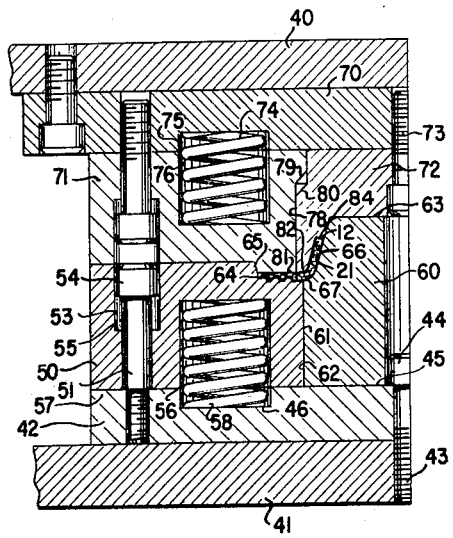
FIG. 4 is a view similar to FIGS. 1, 2 and 3 showing the mold in its fully closed position.
Figure 5:
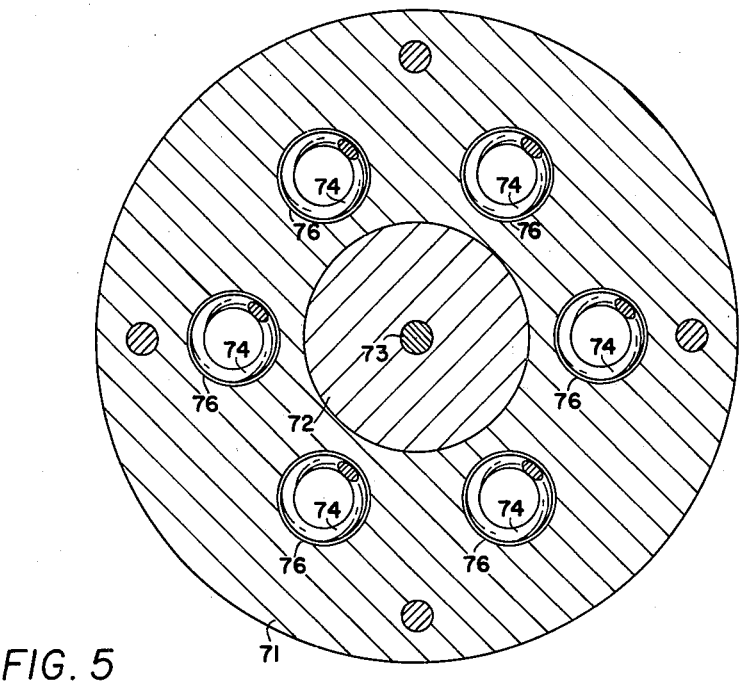
FIG. 5 is a transverse sectional view taken through the upper ring and supporting core on section line 5—5 of FIG. 1.
Figure 6:
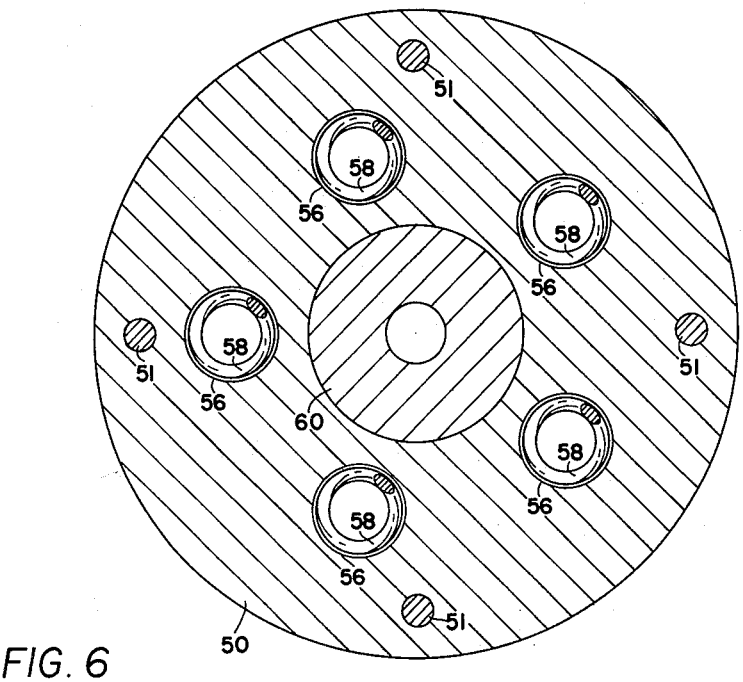
FIG. 6 is a transverse sectional view similar to FIG. 5, but taken through the lower ring and its inner core on section line 6—6 of FIG. 1.

The lower mold half also includes an inner annular core member 60 whose outer periphery 61 is slidably mounted in a circular bore 62 through the ring 50. The core 60 rests on the lower plate member 42 and is retained thereon by gravity so that no bolts are needed to hold it in place. In other words, the core 60 and lower plate member 42 are stationary with respect to each other and are slidable relative to the lower ring 50. The upper surface 52 of the lower ring and the upper surface 63 of the core member 60 are adapted to receive the leather washer 11, as shown in FIGS. 1 and 2. Preferably, but not necessarily the entire leather washer 11 has previously been coated on both its surfaces and both its peripheral edges with a heat-curable material such as that disclosed in patent application of Clifford A. Stephens and Robert W. McCandless, Serial No. 540,104, filed October 12, 1955, now Patent 2,854,267, of September 30, 1958, although other heat-curable materials may be used and only the inner annular portion of the leather washer 11, need be so coated for molding contact with the ridged surface 64 of the lower ring 50, and the opposed cooperating upper ring portion of the ring 71. For this purpose, a shelf 64 and ledge 65 are provided on the lower ring 50, and the shelf 64 is provided with a series of concentric depressions between concentric ridges adapted to form corresponding serrations on the leather washer under the clamping pressure and the vulcanizing. The core member 60 is provided with a generally frusto-conical surface portion 66, together with a small tapering radius portion 67 at its base.

The upper half of the mold comprises the upper platen 40, an upper plate member 70, an upper ring 71 spring-mounted to the upper plate member 70 and normally urged away therefrom, and an upper core 72 which is larger in diameter than the lower core 60 and is secured to the plate 70 by a bolt 73 and moves therewith. A greater number or stiffer and/or stronger coiled springs 74 are seated in cooperating recesses 75 and 76. The inner periphery 77 of the upper ring 71 and the outer periphery 78 of the core member 72 are preferably provided with co-acting stop members 79 and 80 to limit the movement of the ring 71 and core 72 relative to each other. The lower surfaces 81 and 82 of these members are provided with surfaces for engaging and confining the leather element 20 in cooperation with the lower mold, as will be shown in following the process from FIG. 1 through 4. The core 72 has its surface 82 so constructed as to fully confine the lip portion of the washer by a frusto-conical portion 83 and an end ledge 84, and its lower end 85 provides the corner radius 23.

The molding operation

In FIG. 1, the mold is shown in its open position with the leather washer 11 placed therein and resting flat on the shelf 64 and on or, preferably, slightly above the top 63 of the lower core 60. The next step is to lower the upper member so that the lower surface 81 of the upper ring 71 engages the leather washer 11. When this is done, it will be seen from the drawings that further closing of the mold can occur only if one or the other of the upper and lower rings 50, 71 moves. A method of relating the spring pressures is provided so that the lower ring 50 will be the first to move, with the result that the innermost more easily deflected portion of the leather washer 11 will be first deflected and the intermediate portion lying between the clamped portion and the innermost portion will later on be deflected under greater pressure. This may be provided by using heavier springs 74 in the upper member, or it may be provided more simply by using more of the same kind of springs. Thus, if there are three springs 58 in the lower half of the mold, there may be four springs 74 between the upper members 70 and 71; if there are six between the lower members 42 and 50, there may be seven between the upper members 70 and 71.

As shown in FIG. 2, the lower ring 50 is pushed down by the upper mold half, causing a relative movement between the firmly clamped leather washer 11 and the core member 60, which deflects the inner annular portion 19 of the leather washer 11 upwardly. The motion downward continues until the lower surface 57 of the lower ring 50 engages the upper surface 45 of the lower plate 42, the motion thereby being stopped positively in the position shown in FIG. 3. At this time the leather member 11 has been deflected into a generally frusto-conical shape, but as will be seen, it has not yet received its final shape. In other words, the innermost portion has been deflected, but the intermediate portion between the innermost portion and the clamped portion has not been moved to its final position. That is obtained when the upper plate 70 moves down against the pressure of the greater-pressure springs 74 between the upper ring 71 and the upper plate 70. The plate 70 moves until the lower surface of the upper plate 70 engages the upper surface of the upper ring 71, the motion thereby being positively stopped. This is the position shown in FIG. 4, the final position of the mold before and during curing. It will be seen that the upper core member 72 is now in contact with the washer and that the inner peripheral edge 12 of the leather member is confined by the ledge 84. In fact, the whole sealing lip portion 21 of the leather member is confined between the two core members 60 and 72. Deflection of this leather member 11 has therefore been achieved in the most efficient manner by first deflecting an innermost portion and then forming the intermediate portion, as explained above.

The molds are heated, preferably by heating the upper and lower platens 40 and 41 to obtain a temperature of about 240° F. (or whatever curing temperature is desired) in the mold elements themselves. At this temperature, and with a preferable type of synthetic rubber coating, it will take only about 45 seconds for the seal to cure. The cured rubber will retain the leather seal 20 in its molded position indefinitely, and even in the face of pressure to move it in opposite directions.

Thus, a simple and rapid production can be obtained saving time, labor, and material and resulting in a better sealing element.

As already implied, the process is applicable to materials other than leather. The word "leather" has been used as an example of a suitable material, but other fibrous materials or other materials capable of undergoing this process and of giving satisfactory sealing elements may be used in its place. In the claims, too, "leather" as a term is intended to include such equivalent materials.

To those skilled in the art to which this invention relates, many additional changes in construction and widely differing embodiments of the invention will suggest themselves without departing from the spirit and scope of the invention as defined in the claims.

What is claimed is:

1. An apparatus for molding cut-to-size leather washers and the like into annular sealing elements with a radial flange and a frusto-conical lip, without pinching off their peripheries comprising a lower plate member; a lower ring member secured to said lower plate member by a lost-motion connection; first spring means normally urging said members apart; an annular lower core member inside and movable relative to said ring member and resting on and stationary with respect to said plate member; an upper plate member; an upper ring member secured to said upper plate member by a lost-motion connection; second spring means, stronger than said first spring means, normally urging apart said upper plate member and said upper ring member; and an upper core larger in diameter than said lower core member inside and movable relative to said upper ring member and secured rigidly to said upper plate member, said core members cooperating with meeting surfaces to define between them a cavity closed at its inner periphery; whereby when said mold is closed said ring members first come together and clamp an outer portion of said leather washer firmly between them, then said lower ring member is forced down into engagement with said lower plate member, so that said lower core member pushes up an innermost portion of said leather washer where the leverage is greater, thereby insuring that when said core members later meet, said leather washer will lie inside said cavity and will not have its inner periphery pinched off, then said upper ring member is forced up against said upper plate member so that said upper core member and lower core member shape and clamp between them in said closed cavity the inner portion of said leather washer without pinching off its inner periphery.

2. An apparatus for molding leather washers and the like into annular sealing elements with a radial flange and a frusto-conical lip, comprising a lower mold half having a spring-mounted lower ring member and a lower core member inside and movable relative to said ring member; and an upper mold half having a spring-mounted upper ring member mounted under greater spring force than said lower ring member; and an upper core of larger diameter than said lower core inside and movable relative to said upper ring member and secured rigidly to said upper plate member, whereby, when said mold is closed, said ring members first come together and clamp an outer portion of said leather washer between them with an inner portion free, then said lower ring member is forced down against its spring mounting so that said lower core member pushes up an innermost rim portion of said leather washer, then said upper ring member is forced up against its spring mounting so that said upper core member forms the remainder of said inner portion and clamps all said inner leather washer portion against said lower core member.

3. The apparatus of claim 2 in which said lower ring member is provided with an upper surface portion adapted to receive said leather washers, said surface portion having a plurality of concentric grooves and valleys.

4. The apparatus of claim 2 in which said lower ring member is provided with an upper surface portion adapted to receive a said leather washer, said surface portion having thereon a series of ridges thereon to provide a serrated clamping surface and for applying serrations to said washer.

5. An apparatus for molding leather washers and the like into annular sealing elements with a radial flange and a frusto-conical lip, comprising a lower plate member having an upper surface provided with a plurality of spring-seating recesses; a lower ring member secured to said lower plate member by a lost-motion connection and having a lower surface provided with a corresponding number of spring-seating recesses; a plurality of first springs seated in said recesses normally urging said members apart and collapsible to prevent contact between them; an annular lower core member inside and movable relative to said ring member and resting on and stationary with respect to said plate member; an upper plate member having a lower surface provided with a greater number of spring-receiving recesses than said lower plate member; an upper ring member secured to said upper plate member by a lost-motion connection and having its upper surface provided with a corresponding number of spring-receiving recesses; a plurality of second springs greater in number than said first spring means in said recesses normally urging apart said upper plate member and said upper ring member; and an upper core larger in diameter than said lower core member inside and movable relative to said upper ring member and secured rigidly to said upper plate member whereby when said mold is closed said ring members first come together and clamp an outer portion of said leather washer between them, leaving an inner portion thereof free, then said lower ring member is forced down into engagement with said lower plate member so that said lower core member pushes up an innermost portion of said leather washer, then said upper ring member is forced up against said upper plate member so that said upper core member forms the remainder of said inner portion and clamps all of said inner leather washer portion against said lower core member.

References Cited in the file of this patent
UNITED STATES PATENTS

| | | |
|---|---|---|
| 1,935,832 | De Lackner | Nov. 21, 1933 |
| 2,223,321 | Kempe | Nov. 26, 1940 |
| 2,377,351 | Martin | June 5, 1945 |
| 2,382,873 | Goodwin | Aug. 14, 1945 |
| 2,453,987 | Green et al. | Nov. 16, 1948 |
| 2,685,218 | Burns | Aug. 3, 1954 |
| 2,760,231 | St. Clair | Aug. 28, 1956 |